July 11, 1950    E. D. SCHLAPHOFF ET AL    2,514,725
DIRIGIBLE SPRAYING DEVICE FOR USE IN SPRAYERS
OF THE ARTICULATED BOOM TYPE
Filed Feb. 21, 1949            2 Sheets-Sheet 1
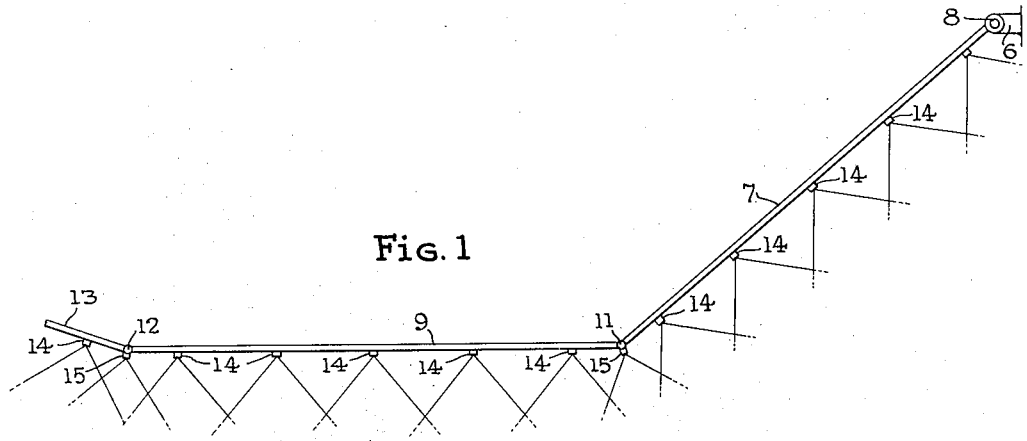
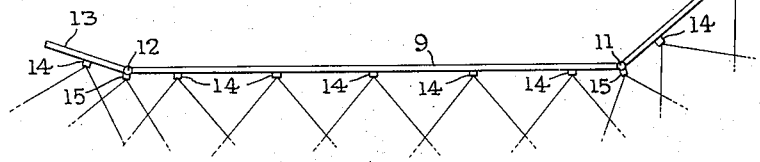
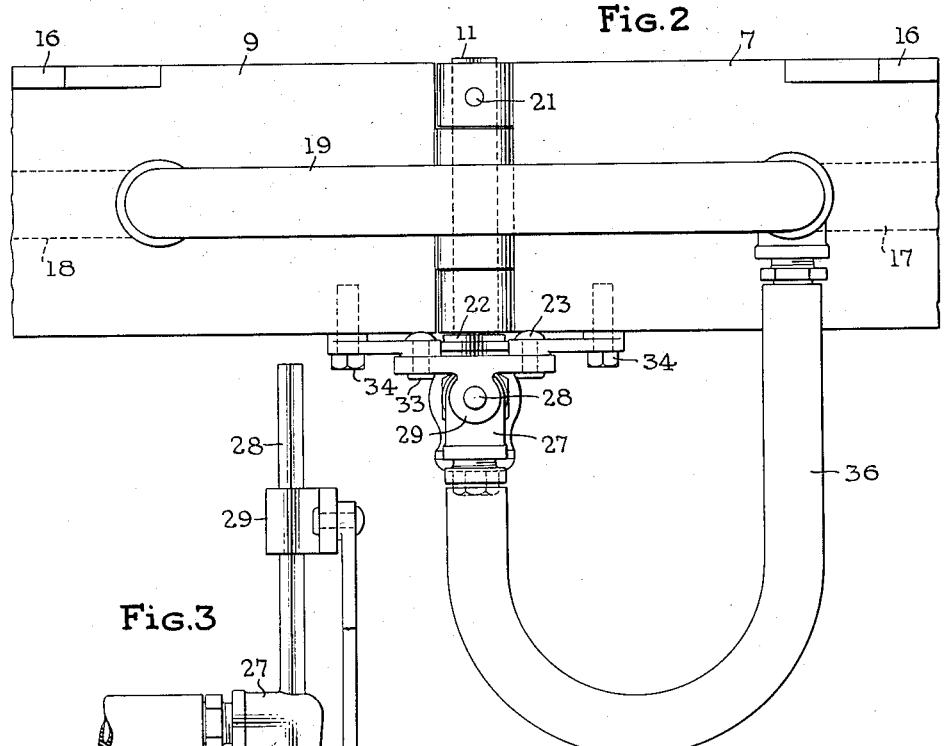
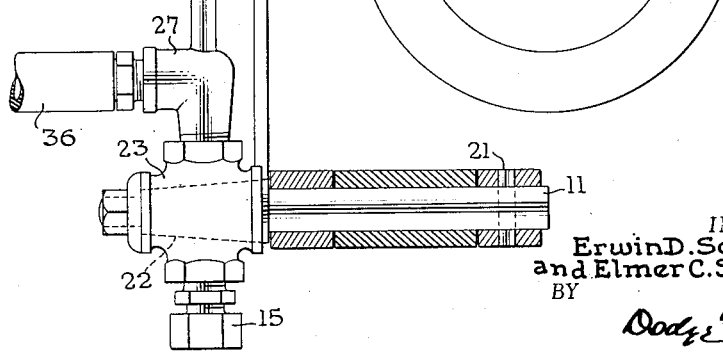
INVENTORS
Erwin D. Schlaphoff
and Elmer C. Schlaphoff
BY
Attorneys July 11, 1950
E. D. SCHLAPHOFF ET AL
2,514,725
DIRIGIBLE SPRAYING DEVICE FOR USE IN SPRAYERS
OF THE ARTICULATED BOOM TYPE
Filed Feb. 21, 1949
2 Sheets-Sheet 2
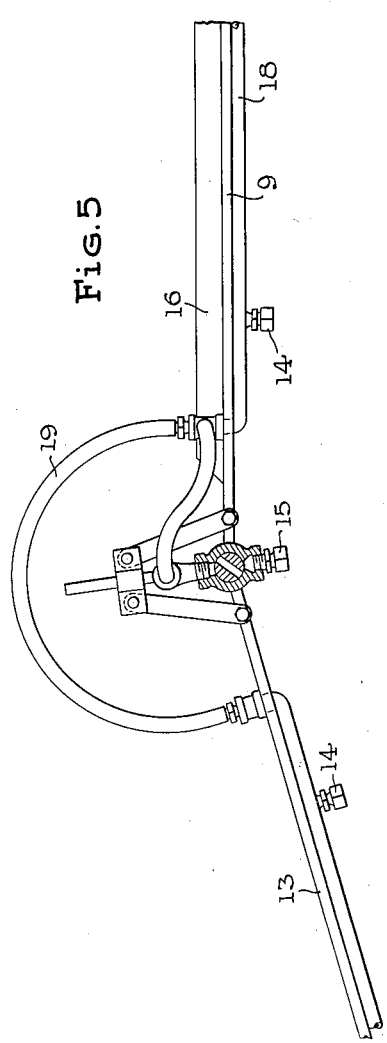
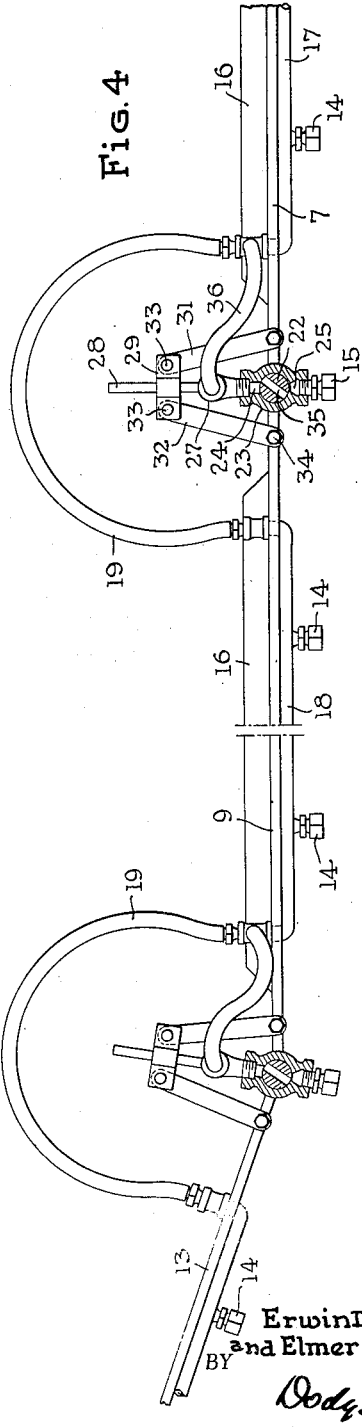
INVENTORS
Erwin D. Schlaphoff
and Elmer C. Schlaphoff
BY
Attorneys Patented July 11, 1950

2,514,725

UNITED STATES PATENT OFFICE 2,514,725

DIRIGIBLE SPRAYING DEVICE FOR USE IN SPRAYERS OF THE ARTICULATED BOOM TYPE

Erwin D. Schlaphoff and Elmer C. Schlaphoff, Waverly, Nebr.

Application February 21, 1949, Serial No. 77,632

4 Claims. (Cl. 299—72)

This invention relates to spraying machines for roadside and orchard spraying and like purposes.

In a spraying machine developed by the present applicants, and not herein claimed, a motor propelled vehicle carries a laterally projecting boom, which (so far as is here material) comprises two or more sections hinged together on horizontal axes. The boom sections are controlled so as to conform roughly to the contour of the vegetation being sprayed. This may be above or below the level of the road on which the vehicle travels.

Spaced along the boom sections are spray nozzles, here assumed to be directed downward when the boom is horizontal since that is the usual nozzle arrangement. Each nozzle delivers a spray fan and these fans overlap, so long as the boom sections aline. However if an outer section is swung upward relatively to the next inner section the overlap between downward-directed sprays at the opposite sides of the hinge diminishes, and at some angle ceases altogether.

The invention provides a dirigible nozzle which swings on an axis substantially coincident with the hinge axis and is mechanically connected to the hinged parts in such a way that it moves angularly at half the angular rate of the hinge motion. The dirigible nozzle is so directed that the fan of spray furnished by it fills in the gap which would otherwise occur when, for example, an outer section of the boom is swung up more steeply than the adjacent inner section.

While such a dirigible nozzle could be supplied with spray liquid continuously, it is preferable to control supply to the dirigible nozzle by the hinging action of the two related boom sections. Use can be made of a valve actuated by the hinge and so timed as to be closed when the boom sections are alined, or nearly so and also when flexure is the reverse of that above described. In this way waste of expensive spray solutions is minimized and uniform spray distribution is closely approximated.

While the desired results can be attained by various specifically different mechanisms, the one presently preferred makes use of a plug cock as the valve. The pintle of the hinge is pinned to one hinge leaf and carries fixed to one of its ends the plug of the cock. The body of the cock is supported by the plug and carries the spray head. A guide rod fixed on the cock body, a sliding block slidable on the guide rod and two links pivoted to the block and to respective boom sections move the body so that the axis of the spray nozzle always bisects the angle between the boom sections.

This construction which is preferred because it avoids the use of packed joints and is extremely simple to manufacture, is illustrated in the accompanying drawing, in which:

Figure 1 is a diagram of so much of a sprayer as is necessary to indicate the environment in which the invention is used.

Figure 2 is a plan view of a hinge between two boom sections showing the improved valve and sprayhead in place.

Figure 3 shows the cock and sprayhead in elevation and the hinge of Figure 2 in vertical axial section, the view being taken looking to the left relatively to Figure 2.

Figure 4 is a view showing the inner and the intermediate sections horizontal and consequently alined and the outer section tilted upward, to indicate in section the positions assumed by the valves.

Figure 5 is a similar view showing the intermediate section horizontal and the outermost section inclined downward. This view shows how the valve closes when this relationship is assumed.

Referring first to Figure 1 which is a diagram omitting mechanical details, 6 represents a portion of the vehicle on which the spray boom is mounted and 7 is the first or innermost section of the spray boom. It is hinged to the part 6 on a horizontal hinge axis indicated at 8. Intermediate section 9 is hinged on a horizontal axis 11 to the inner section 7 and on a horizontal axis 12 to an outer boom section 13 only a short portion of which is indicated in the drawing.

With the parts positioned as shown in Figure 1 the sprayer could be used to spray a ditch beside a road. Thus the boom section 7 is inclined downward, the intermediate section 9 is horizontal and the outermost section 13 is inclined upward.

Mounted at intervals along the lower sides of boom sections 7, 9 and 13 are a series of spray nozzles 14 whose precise form is immaterial except that they spray liquid in fans or cones whose limits are indicated on the drawing.

As is indicated in Figure 1 the fans of spray delivered by the nozzles 14 on the various sections 7, 9 and 13 overlap. However the two end sprays on each of the sections will overlap when the two sections are alined but the overlap diminishes as the parts swing to positions such as those indicated in Figure 1. To fill in the gap a dirigible nozzle indicated at 15 is associated with each hinge and that dirigible nozzle and its related mechanism involve the important novel features of the present invention.

For purposes of discussion it will be assumed that the hinge illustrated in Figures 2 and 3 is the hinge whose pivot appears at 11 and connects the boom sections 7 and 9. As a convenient construction the boom sections 7 and 9 are each formed of angle iron, having flanges 16 which are cut away adjacent the hinge. The end section 13 is constructed as a simple bar of rectangular cross-section. The nozzles 14 are fed by tubes 17, 18 which are attached to the sections 9 and 13 and connected past the hinges by bowed rubber connector 19. The ends of the sections 7, 9 and 13 are notched as clearly shown in Figure 2 and are formed with eyes to receive the hinge pin 11.

Pin 11 is fixed in the section 7 by a stake or rivet 21. Thus the pin 11 in Figure 2 is fixed to the boom section 7 and turns in the eye formed in the boom section 9. Fixed on the end of the pivot 11 is the plug 22 of a plug cock whose body is indicated at 23. The body has an inlet port 24 and an outlet port 25 which leads to a spray-head conventionally represented at 15. An elbow fitting 27 is screwed into the inlet port 24 and carries an upstanding guide stem 28. Mounted to slide on the stem 28 is a crosshead 29 and this crosshead is connected by links 31 and 32, one to the boom section 7 and the other to the boom section 9. The links are hinged to the crosshead 29 in any suitable manner, for example, by rivets 33 and they are hinged to the boom sections in any suitable way, for example, by machine screws 34 as indicated. The hinge connection and valve at the junction of sections 9 and 13 are constructed in the same way.

As the sections 7 and 9 hinge about the pin 11 the body 23 will turn on the plug 22 with an angular motion which is precisely half the relative angular motion of the boom sections 7 and 9. The plug 22 has the usual through port 35 and the hole for the pin 21 is so located that when the members 7 and 9 are alined, port 35 is closed with sufficient lap so that it will not start to open until one of the members 7 or 9 has swung up slightly with reference to the other.

In Figure 4 the sections 7 and 9 are shown alined. The cock is closed. Consequently the dirigible spray nozzle 15 at the junction between the boom sections 7 and 9 is out of action. In Figure 4 the end section 13 is shown inclined upward relatively to the intermediate section 9 and its valve has started to open so that the dirigible nozzle at the junction between sections 9 and 13 is in action.

As a practical matter the port through the plug of the cock is of substantial dimension in the direction of the axis of the plug so that as soon as the port starts to open a passage adequate to feed the nozzle 15 is afforded with a very slight angular motion. Liquid is supplied to the intake port of the cock body by a looped rubber hose 36 which leads from a branch connection to the main line on one of the boom sections.

Figure 5 indicates the fact that the valve is closed when two sections swing from alinement in a direction to increase the overlap of the sprays on the boom sections. From a comparison of Figures 4 and 5 it will be readily apparent that the dirigible spray nozzles are cut off when the adjacent boom sections are alined and also when they are swung out of alinement in a direction to increase the spray overlap. However if these same two sections are swung out of alinement in the opposite direction so that the spray overlap tends to diminish the dirigible spray commences to operate. As a practical matter it is considered desirable that the booms move out of alinement in this direction by a small angle before operation of the spray commences but this is a matter of degree and it can be determined by choice of the position in which the hinge pin 11 is fixed by the stake 21.

A useful result can be had by providing the dirigible nozzles at the hinge and supplying these dirigible nozzles continuously. However a better result and better economy in the use of expensive spray solutions can be had by including a valve control of the general type described. The linkage which controls the direction of the spray so that the spray axis bisects the angle between the two boom sections is probably the simplest mechanism of this type which can be devised. However other equivalent mechanisms for performing this function can be substituted, and except as specifically stated in the claims, limitation to the illustrated structure is not intended.

A plug cock is probably the simplest type of valve available and it is preferred because of its inexpensive construction, its ready availability in the market and the fact that it requires no special packing. It is, however, basically a stop valve and the possibility of substituting other types of stop valve is fully appreciated.

What is claimed is:

1. A jointed spraying boom comprising at least two sections hinged together on a transverse axis, so as to be movable angularly one relatively to another; spray nozzles mounted at intervals along the length of each of said sections; a dirigible nozzle mounted to swing about an axis substantially coincident with the axis of said hinge; mechanism actuated by the relative angular motion of the boom sections and connected to swing said nozzle at an angular rate which is substantially half said relative angular motion; and connections for supplying to all said nozzles liquid to be sprayed.

2. A jointed spraying boom comprising at least two sections hinged together on a transverse axis, so as to be movable angularly one relatively to another; spray nozzles mounted at intervals along the length of each of said sections; a dirigible nozzle mounted to swing about an axis substantially coincident with the axis of said hinge; mechanism actuated by the relative angular motion of the boom sections and connected to swing said nozzle at an angular rate which is substantially half said relative angular motion; connections for supplying to all said nozzles liquid to be sprayed; and valve means controlling flow to said dirigible nozzle and actuated by relative angular motion of two adjacent boom sections, said valve means being so arranged as to open when said boom sections move angularly in one direction from alinement beyond a chosen angle.

3. The combination of two boom sections; spaced spray heads carried by said sections; a pin forming a hinged connection between said sections; means fixing said hinge pin to one of said sections; a plug cock comprising a ported plug carried by said hinge pin in substantially coaxial alinement therewith, and a body rotatable on said plug and having inlet and discharge ports capable of registering simultaneously with the port in the plug in a limited range of positions; a spray head connected to said discharge port; a guide fixed to the cock body; a cross head guided by said guide; links connecting said crosshead with respective boom sections; and tubular connections for supplying liquid to be sprayed to said spaced spray heads and to the inlet of said cock body.

4. The combination defined in claim 3 in which the hinge pin is fixed to one boom section in such position that the cock is closed when the boom sections are alined, and when they are displaced angularly from alinement in one direction, and opens as the sections move angularly from alinement in the opposite direction.

ERWIN D. SCHLAPHOFF.
ELMER C. SCHLAPHOFF.

REFERENCES CITED

The following references are of record in the file of this patent:

UNITED STATES PATENTS

| Number    | Name     | Date           |
|-----------|----------|----------------|
| 2,329,331 | Brosemer | Sept. 14, 1943 |
| 2,444,367 | Prescott | June 29, 1948  |